US009376548B2

(12) United States Patent
Hagstrand et al.

(10) Patent No.: US 9,376,548 B2
(45) Date of Patent: Jun. 28, 2016

(54) POLYOLEFIN COMPOSITION WITH INCREASED RESISTANCE TO CLO2-CONTAINING WATER

(71) Applicant: BOREALIS TECHNOLOGY OY, Porvoo (FI)

(72) Inventors: Per-Ola Hagstrand, Stenungsund (SE); Perry Nylander, Göteborg (SE); Mats Bäckman, Göteborg (SE)

(73) Assignee: BOREALIS TECHNOLOGY OY, Porvoo (FI)

( * ) Notice: Subject to any disclaimer, the term of this patent is extended or adjusted under 35 U.S.C. 154(b) by 0 days.

(21) Appl. No.: 14/144,994

(22) Filed: Dec. 31, 2013

(65) Prior Publication Data

US 2014/0109975 A1    Apr. 24, 2014

Related U.S. Application Data

(62) Division of application No. 12/443,645, filed as application No. PCT/EP2007/008385 on Sep. 26, 2007, now abandoned.

(30) Foreign Application Priority Data

Oct. 2, 2006   (EP) .................................... 06020747

(51) Int. Cl.
*C08K 5/375*  (2006.01)
*C08K 5/13*   (2006.01)
*C08K 5/3435* (2006.01)

(52) U.S. Cl.
CPC . *C08K 5/375* (2013.01); *C08K 5/13* (2013.01); *C08K 5/3435* (2013.01); *Y10T 137/0318* (2015.04)

(58) Field of Classification Search
None
See application file for complete search history.

(56) References Cited

U.S. PATENT DOCUMENTS

| | | | |
|---|---|---|---|
| 3,370,036 A | 2/1968 | Martinovich et al. | |
| 4,131,599 A | 12/1978 | Brunetti et al. | |
| 4,221,699 A | 9/1980 | Arnaud et al. | |
| 4,532,165 A * | 7/1985 | Hashimoto et al. | 428/36.9 |
| 5,266,616 A | 11/1993 | Wolfe | |
| 5,858,246 A * | 1/1999 | Rafter | C02F 1/505 210/753 |
| 6,538,056 B1 | 3/2003 | Webster | |
| 6,541,547 B1 | 4/2003 | Kramer et al. | |
| 6,680,351 B1 | 1/2004 | Russell et al. | |
| 7,008,543 B2 * | 3/2006 | Newkirk | C02F 1/78 210/667 |
| 7,238,765 B2 | 7/2007 | Lee et al. | |
| 7,335,694 B2 | 2/2008 | Oobayashi | |
| 7,744,972 B2 | 6/2010 | Ho et al. | |
| 2003/0158306 A1 | 8/2003 | Battiste et al. | |

FOREIGN PATENT DOCUMENTS

| | | |
|---|---|---|
| CA | 1120630 A * | 3/1982 |
| DE | 1947071 A | 9/1970 |
| EP | 0 310 393 A2 | 4/1989 |
| EP | 0 739 937 A2 | 10/1996 |
| EP | 0 810 235 A2 | 12/1997 |
| EP | 1253169 A2 | 10/2002 |
| GB | 1087403 A | 10/1967 |
| JP | 56080458 A * | 7/1981 |
| JP | 58059025 A | 4/1983 |
| JP | 1989-056747 A | 3/1989 |
| JP | 1056747 | 3/1989 |
| JP | 1288425 | 11/1989 |
| JP | H1-288425 A | 11/1989 |
| JP | 1990-153955 A | 6/1990 |
| JP | 2153955 | 6/1990 |
| JP | 02153955 A * | 6/1990 |
| JP | 11147976 A | 6/1999 |
| JP | 11-293050 | 10/1999 |
| JP | 2004315715 | 11/2004 |
| SU | 1072420 A1 | 11/1996 |
| WO | 99/31675 | 6/1999 |
| WO | 02/102891 | 12/2002 |
| WO | 2004/009356 A1 | 1/2004 |
| WO | 20041009356 A1 | 1/2004 |
| WO | 2004/055068 | 7/2004 |
| WO | 2004/055069 | 7/2004 |
| WO | 2004/090032 A1 | 10/2004 |
| WO | 2005/056657 | 6/2005 |

(Continued)

OTHER PUBLICATIONS

JP 02153955 A, Jun. 1990, Derwent Ab.*
JP 56080458 A, Jul. 1981, Derwent Ab.*
"Standard Test Method for Evaluating the Oxidative Resistance of Polyethylene (PE) Pipe to Chlorinated Water", ASTM F 2263-07, ASTM International, USA (2007).
Frederick Van Buren, "Standard Test Method for Evaluating the Oxidative Resistance of Polyethylene (PE) Pipe to Chlorinated Water", ASTM F 2263-03.
Helmut Vogt et al., "Chlorine Oxides and Chlorine Oxygen Acids", Standard Article, Ullmann's Encyclopedia of Industrial Chemistry, DOI: 10. 100322 4356007 .a-6-483. pub 2 (2010).
Georg Thieme Verlag, "Chlorsaure" (Chloric Acid), Rompp Online, Version 3. 1 2 last update of entry: Nov. 2006.

(Continued)

*Primary Examiner* — Satya Sastri
(74) *Attorney, Agent, or Firm* — Roberts Mlotkowski Safran & Cole, P.C.

(57) ABSTRACT

The present invention relates to a polyolefin composition comprising a polyolefin base resin and an antioxidant, characterized in that said polyolefin composition has a lifetime of at least 200 h in a test measuring the resistance against $ClO_2$-containing water at 90° C. and at a concentration of $ClO_2$ of 4 ppm wherein the equipment used is according to ASTM F2263-03.
The present invention further relates to a pipe comprising the polyolefin composition according to the invention, to the use of the polyolefin composition for the production of a pipe, and to the use of a particularly selected antioxidant for increasing the resistance of a polyolefin composition against degradation caused by contact with $ClO_2$-containing water.

7 Claims, No Drawings

(56) References Cited

FOREIGN PATENT DOCUMENTS

| WO | 2005/056657 A2 | 6/2005 |
|---|---|---|
| WO | 2005056657 A2 | 6/2005 |
| WO | 2006/124226 | 11/2006 |
| WO | 2010/072374 A1 | 7/2010 |

OTHER PUBLICATIONS

J. Hassinen et al., "Deterioration of Polyethylene Pipes Exposed to Chlorinated Water", Polymer Degradation and Stability 84, S. 261-267, DOI: 10.1016/j.polymdegradstab.2003.10.019 (2004).

Georg Thieme Verlag, "Chlordioxid" (Chlorine Dioxide), Rompp Online, Version 3. 1 2, last update of entry: Nov. 2003.

Georg Thieme Verlag, "Chlorierung" (Chlorination), Rompp Online, Version 3. 1 2, last update of entry: Oct. 2002.

Georg Thieme Verlag, "Chlorierung" (Chlorination), Rompp Online, Version 3. 1 2, last update of entry: Dec. 2007.

L. M. Moore et al., "Degradation and Stabilisation of Blue Water Pipe", Polymer Degradation and Stability 20, p. 337-354 (1988).

Alfred G. Oerteli et al., "Improved Performance for HDPE Pressure Pipes Used for Chlorinated Water", Presentation from Ciba Specialty Chemicals, p. 1-5, publsihed 2001-2002.

M. Rozental et al., "Journees Informations Eaux", 17th Edition, p. 76-1-76-12, Sep. 26-28, 2006.

Dr. Hans Zweifel, "Plastics Additives Handbook", Hanser 5th Edition, pg. 15-16 and 28-29 (2001).

Ilgiz M. Ganiev et al., "Complexes of Chlorine Dioxide with Nitroxyl Radicals", Tetrahedron Letters 40, p. 4737-4740 (1999).

Xavier Colin et al., "Stabilizer Thickness Profiles in Polyethylene Pipes Transporting Drinking water Disinfected by Bleach", Polymer Engineering Science 51, 1542 (2009).

M. Rozental et al., "A Reliable Bench Testing for Benchmarking Oxidation Resistance of Polyethylene in Disinfected water Environments", lecture presented at Plastic Pipe 2008, Sep. 2008.

Xavier Colin et al., "Kinetic Modeling of the Aging of Polyethylene Pipes for the Transport of Water Containing Disinfectants", In Proceedings of Plastic Pipes XIII, Oct. 2-5, 2006.

Xavier Colin et al., "Aging of Polyethylene Pipes Transporting Drinking Water Disinfected by Chlorine dioxide. Part I—Chemical Aspects", Polymer Engineering Science 49, 1429, DOI: 10 1002/pen 21258 (2009).

Xavier Colin et al., "Aging of Polyethylene Pipes Transporting Drinking Water Disinfected by Chlorine Dioxide. Part II—Lifetime Prediction", Polymer Engineering Science 49, 1642, DOI: 10 1002/pen 21387 (2009).

W. Yu et al., "Polymer Degradation and Stability", Deterioration of Polyethylene Pipes Exposed to Water Containing Chlorine Dioxide, 96790, DOI: 10. 1016/j. polymdegradstab. 2011. 02. 009 (2011).

B. Azhdar et al., "Polymer Testing", A New Method for Assessing the Efficiency of Stabilizers in Polyolefins Exposed to Chlorinated Water Media, 28661, DOI: 10. 1016/j. polymdegradstab. 2009. 05. 010 (2009).

S. Chung et al., "The Mechanisms of Chlorine Dioxide Oxidation of Plastic Piping Systems", Annual Technical Conference Society of Plastic Engineers, 2419 (2008).

Heinz E. P. Vogt et al., "Polyolefin Pipe Grades with Improved Resistance to Water Disinfectants", Apr. 26, 2012.

J. Hassinen et al., "Deterioration of Polyethylene Pipes Exposed to Chlorinated Water", Polymer Degradation and Stability 84, S. 261-267, DOI: 10. 1016/j. polymdegradstab. 2003. 10. 019 (2004).

Congress Timetable "Pipeline Integrity by Corrosion Protection", Wednesday, May 31, 2006, CEOCOR Luxembourg, accessible via http://web.archive.org/web/20060720121343/http://www.ceocor.lu/.

"Lowinox TVM-6P", Thiophenol Antioxidant, Data Sheet (2007).

"Irganox 1010", Phenolic Primary Antioxidant for processing and long-Term Thermal Stabilization, Data Sheet, First Edition, 1998.

"Irgafos 168", Processing Stabiliser, Data Sheet, Edition, May 31, 2005.

F. Albert Cotton et al., "Advance Inorganic Chemistry", A Comprehensive Text, 3rd Edition, 1972, p. 473-474.

Aieta et al, "A Review of Chlorine Dioxide in Water Treatment", Journal AWWA, Jun. 1986, p. 62-72.

"Plastics Piping and Ducting Systems—Determination of the Long-term Hydrostatic Strength of Thermoplastics Materials in Pipe Form by Extrapolation", ISO 9080, 2003.

"Irganox PS 802", Thiosynergist Heat Stabilizer, Data Sheet, First Edition, Sep. 1979.

Thomas Hjertberg, "A Comparison Between Chlorine and Chlorine Dioxide on Their Action on PE Pipes", Jun. 1, 2012.

World Health Organization, "Chlorine in Drinking Water", originally published in Guidelines for drinking-water quality, 2nd ed. vol. 2. Health criteria and other supporting information, World Health Organization, Geneva, 1996, pp. 1-11.

U.S. Army Corp of Engineers, "Alternatives to Chlorine Disinfection at the Fort Bragg, NC Drinking Water Treatment Plant", Public Works Technical Bulletin 200-1-63, Jan. 1, 2009, pp. 1-76.

ASTM International, Standard Test Method for Evaluating the Oxidative Resistance of Polyethylene (PE) Pipe to Chlorinated Water, Designation F 2263-07 (Current edition approved Mar. 1, 2007. Published Apr. 2007. Originally approved in 2003. Last previous edition approved in 2005 as F2263-05), pp. 1-6.

"Assessment of the Chlorine Resistance of Two PE Pipe Formulations", Jana, Mar. 11, 2010, pp. 1-4.

"Publications of 50 years of Study on corrosion Problems" European Committee for the study of corrosion and protection of pipes and pipelines systems—Drinking water, waste water, gas and oil, Aug. 10, 2015, pp. 1-3.

M. Rozental-Evesque et al., "Effect of water disinfectants on the ageing of polyethylene pipes", pp. 1-10, 2006.

"Congress Timetable", Pipeline integrity by corrosion protection, May 31, 2006, 1 page.

\* cited by examiner

POLYOLEFIN COMPOSITION WITH INCREASED RESISTANCE TO CLO2-CONTAINING WATER

The present invention relates to a polyolefin composition with increased resistance to degradation caused by $ClO_2$-containing water and to a pipe made of such a polyolefin composition. The present invention further relates to the use of the polyolefin composition for the production of a pipe and to the use of a specific antioxidant for increasing the resistance of the polyolefin composition against degradation caused by contact with $ClO_2$-containing water.

It is known that chlorine in different molecular forms is used as disinfectant in water treatment to prevent spread of infectious diseases. It is also known that most materials, including many polymers such as polyolefins, age in chlorinated water. Results from pressure testing in laboratories and experience from the field have shown that high concentration of chlorine in water can cause early brittle fracture in polyolefin pipes.

The term "chlorinated water" as used herein denotes water which contains chlorine, i.e. the following three forms in equation which is dependent on the pH value and known to the person skilled in the art: $Cl_2$, HOCl, and $ClO^-$. Chlorinated water can be produced by adding chlorine gas ($Cl_2$) or sodium hypochlorite (NaOCl) to water.

In order to increase the lifetime of polyolefin pipes exposed to chlorinated water, it is known to add various antioxidants to the composition the pipe is made of. Suitable and often used antioxidants are pentaerythrityl-tetrakis(3-(3',5'-di-t-butyl-4-hydroxyphenyl)propionate (CAS No. 6683-19-8, "Irganox 1010"), 1,3,5-trimethyl-2,4,6-tris(3,5-di-t-butyl-4-hydroxyphenyl)benzene (CAS No. 1709-70-2, "Irganox 1330") and tris(2,4-di-t-butylphenyl)phosphite (CAS No. 31570-04-4, "Irgafos 168").

However, a more effective disinfectant used in water is chlorine dioxide, $ClO_2$. The use of chlorine dioxide has been seen as favourable for pipes made of a polyolefin composition, as it does not react with the carbon-carbon main chain of the polyolefin. However, it has been found that $ClO_2$ readily reacts with many antioxidants used in pipe compositions and therefore indirectly increases the aging of the polymers and hence the pipes made thereof.

It has been found that antioxidants used in polyolefin compositions for pipes known to provide a good resistance to chlorinated water do not provide satisfactory resistance against water containing chlorine dioxide. Thus, there is the need for a more efficient antioxidant which provides a better protection against $ClO_2$-containing water to a polyolefin composition, and thus allows for a longer lifetime of e.g. a pipe, made of a polyolefin composition containing such an antioxidant.

A further important issue as regards the presence of antioxidants in polyolefin compositions is the aim to avoid contamination of media transported e.g. in a pipe made of such a polyolefin composition. This is particularly important in case of a pipe transporting drinking water. Generally speaking, it is preferred to use as low concentrations of antioxidant as possible in order to lower the amount of antioxidant which may possibly be extracted by the water transported in the pipe. Further in this context, it is desirable that the antioxidant used has a low tendency to extraction by the water transported in the pipe.

Still further, from an environmental as well as from an economical point of view, it is also desirable to use preferably one antioxidant only, i.e. it is desirable to avoid mixtures of antioxidants.

Accordingly, it is the object of the present invention to provide a polyolefin composition with increased resistance to degradation caused by $ClO_2$-containing water and particularly to provide a pipe with increased lifetime when exposed to $ClO_2$-containing water. Still further, it is an object of the invention that the above objects are achieved by using an amount as small as possible of an antioxidant and that the antioxidant used has a low tendency for extraction by the water transported in a pipe made of such a polyolefin composition.

The present invention is based on the surprising finding that the above mentioned objects can be achieved by a polyolefin composition comprising a polyolefin base resin and a specifically selected antioxidant.

Accordingly, the present invention provides a polyolefin composition comprising a polyolefin base resin and an antioxidant characterized in that said polyolefin composition has a lifetime of at least 200 h in a test measuring the resistance against $ClO_2$-containing water at 90° C. and at a concentration of $ClO_2$ of 4 ppm wherein the equipment used is according to ASTM F2263-03.

As is e.g. shown in the examples, the compositions of the invention show a superior lifetime in said $ClO_2$ water test, and such a superior lifetime and hence improved resistance against water containing $ClO_2$ is not obtained by the use of common antioxidants used for improving the resistance of a polyolefin composition against chlorine-containing water in usual amounts.

The term "base resin" denotes the entirety of polymeric components in the polyolefin composition according to the invention, usually making up at least 90 wt % of the total composition.

The favourable effect of the antioxidants according to the present invention is not dependent on the type of olefin base resin used. The base resin may therefore be any polyolefin composition.

In a preferred embodiment, the antioxidant is selected from
a) the group of phenols according to formula I:

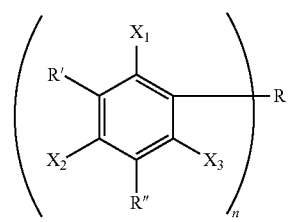

wherein
R is a non-substituted or substituted aliphatic or aromatic hydrocarbyl radical which may comprise heteroatoms or R is a heteroatom,
R' and R" independently are a non-substituted or substituted hydrocarbyl radical which may comprise heteroatoms or H,
$X_1$, $X_2$ and $X_3$ independently are a non-substituted or substituted hydrocarbyl radical which may comprise heteroatoms or H or OH, with at least $X_1$, $X_2$ or $X_3$ being OH,
n is 1 to 4, and at least one of the substituents R, R' and/or R" of the phenol comprises at least one sulphur, phosphorus and/or nitrogen heteroatom(s), or is selected from b) the amine compounds according to formula II:

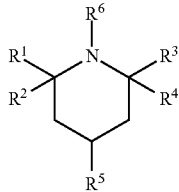

wherein $R^1$, $R^2$, $R^3$, $R^4$, $R^5$ and $R^6$ independently are hydrogen or an aliphatic or aromatic hydrocarbyl radical, optionally comprising heteroatoms, or is selected from c) the sulphur-containing compounds according to formula III:

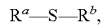

wherein $R^a$ and $R^b$ independently are an aliphatic or aromatic hydrocarbyl radical, optionally comprising heteroatoms.

More preferably, in the antioxidant of said group of phenols a) according to formula I at least one of the substituents R, R' and/or R" of the phenol comprises at least one sulphur heteroatom(s).

In a preferred embodiment of the antioxidant of group a) according to formula I, at least one of the heteroatoms, preferably a sulphur heteroatom, is directly attached to at least one phenol group.

Furthermore, preferably, the heteroatom, preferably sulphur, is present in group R, and preferably is directly attached to at least one phenol group.

In the phenol antioxidants of group a) according to formula I preferably $X^2$ is a hydroxy group.

Furthermore, in formula I preferably R' is a hydrogen atom or a aliphatic hydrocarbyl radical, preferably with up to 10 carbon atoms. Most preferably, R' is a hydrogen atom.

R" in formula I preferably is a hydrogen atom or an aliphatic hydrocarbyl radical, preferably with up to 10 carbon atoms. Most preferably, R" is a t-butyl group.

Still further, preferably in formula I, $X^1$ is a hydrogen atom or an aliphatic hydrocarbyl radical, preferably with up to 10 carbon atoms. Most preferably, $X^1$ is a methyl radical.

$X^3$ in formula I preferably is a hydrogen atom or an aliphatic hydrocarbyl radical, preferably with up to 10 carbon atoms. Most preferably, $X^3$ is a hydrogen atom.

Preferably, R in the phenolic antioxidant according to formula I is an aliphatic hydrocarbyl group, preferably comprising a heteroatom, with preferably up to 10 atoms, or is a heteroatom selected from the group of S, N and P. More preferably, R is a S, N, or P atom, and most preferably, R is a S atom.

Furthermore, preferably n is 2 or 3.

In the amine antioxidants of group b) according to formula II preferably $R^1$, $R^2$, $R^3$ and $R^4$ are the same.

Further preferred, $R^1$, $R^2$, $R^3$ and $R^4$ are aliphatic hydrocarbyl radicals with one to ten carbon atoms each. Still more preferably, all four radicals are a methyl group.

In a further preferred embodiment $R^6$ is hydrogen.

In the sulphur containing antioxidants of group c) according to formula III preferably $R^a$ or $R^b$, more preferably $R^a$ and $R^b$, independently are an aliphatic hydrocarbyl radical, optionally comprising heteroatoms, preferably comprising from 4 to 50 C-atoms, more preferably from 10 to 30 C-atoms.

Furthermore, preferably $R^a$ or $R^b$, more preferably $R^a$ and $R^b$, comprise at least one ester group.

It is within the scope of the invention that the polyolefin composition comprises only antioxidants selected from only one of groups a), b) and c), or any mixture thereof.

However, according to a preferred embodiment of the present invention, the polyolefin composition comprises only antioxidants of one of groups a), b) or c), and more preferably comprises one antioxidant compound only.

The amount of the antioxidant in the polyolefin composition is preferably 5000 ppm or less, more preferably 3500 ppm or less, still more preferably 2500 ppm or less and particularly preferred is 1000 ppm or less.

Usually, the composition will contain the antioxidant in an amount of at least 50 ppm, more preferably of at least 100 ppm.

Examples for preferred antioxidants of the phenols of group a) wherein the heteroatom in the aliphatic part is sulphur are 2,2'-Thiodiethylene bis(3,5-di-t-butyl-4-hydroxyphenyl)propionate (CAS No. 41484-35-9, "Irganox 1035"), 4,4'-Thiobis(2-t-butyl-5-methylphenol) (CAS No. 96-69-5, "Lowinox TBM-6P"), 6,6'-di-t-butyl-2,2'-thiodi-p-cresol (CAS No. 90-66-4, "Irganox 1081").

Examples for preferred antioxidants of the phenols of group a) wherein the heteroatom in the aliphatic part is phosphorus are calcium (3,5-di-t-butyl-4-hydroxybenzyl monoethylphosphonate) (CAS No. 65140-91-2, "Irganox 1425") and 3,5-Bis(1,1-dimethylethyl)-4-hydroxybenzyl diethyl-phosphonate (CAS No. 976-56-7, "Irganox 1222").

Examples for preferred antioxidants of the phenols of group a) wherein the heteroatom in the aliphatic part is nitrogen are 1,3,5-Tris(3',5'-di-t-butyl-4'-hydroxybenzyl)isocyanurate (CAS No. 27676-62-6, "Irganox 3114"), N,N'-Hexamethylene bis[3-(3,5-di-t-butyl-4-hydroxyphenyl)propionamide] (CAS No. 23128-74-7, "Irganox 1098") and N,N'-Bis(3-(3',5'-di-t-butyl-4'-hydroxyphenyl)propionyl)hydrazine (CAS No. 32687-78-8, "Irganox MD 1024").

Examples for preferred antioxidants of the amines of group b) are bis(2,2,6,6-tetramethyl-4-piperidyl)decanediate ("Tinuvin 770", CAS No. 52829-07-9), poly[1-(2'-hydroxyethyl)-4-hydroxy-2,2,6,6-tetramethylpiperidylsuccinate] (CAS No. 65447-77-0, "Tinuvin 622") and poly((6-((1,1,3,3-tetramethylbutyl)amino)-1,3,5-triazine-2,4-diyl)((2,2,6,6-tetramethyl-4-piperidyl)imino)(1,6-hexanediyl)((2,2,6,6-tetramethyl-4-piperidyl)imino)) (CAS No. 71878-19-8, "Chimassorb 944").

An example for a preferred antioxidant of the sulphur-containing compounds of group c) is di-stearyl-thio-di-propionate (CAS No. 693-36-7, "Arenox DS" or "Irganox PS-802 FL").

Preferably, the polyolefin base resin of the composition of the invention comprises a polyethylene, i.e. an ethylene homo- or copolymer.

In one embodiment of the invention the base resin comprises two or more polyolefin, more preferably polyethylene, fractions with different weight average molecular weight. Such resins usually are denoted as multimodal resins.

Polyolefin, in particular polyethylene, compositions comprising multimodal resins are frequently used e.g. for the production of pipes due to their favourable physical and chemical properties as e.g. mechanical strength, corrosion resistance and long-term stability. Such compositions are described e.g. in EP 0 739 937 and WO 02/102891. The term molecular weight used herein generally denotes the weight average molecular weight $M_w$.

As mentioned, usually a polyethylene composition comprising at least two polyolefin fractions, which have been produced under different polymerisation conditions resulting in different weight average molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In the preferred embodiment wherein the base resin consists of two polyethylene fractions, the fraction having a lower weight average molecular weight is denoted fraction (A), the other is denoted fraction (B).

Fraction (A) preferably is an ethylene homopolymer.

Fraction (B) of the polyethylene composition preferably is an ethylene copolymer, and preferably comprises at least 0.1 mol % of at least one alpha-olefin comonomer. The amount of comonomer is preferably at most 14 mol %.

In the preferred embodiment wherein the polyolefin composition is a polyethylene composition, the base resin of the polyethylene composition preferably comprises at least 0.1 mol %, more preferably at least 0.3 mol %, and still more preferably at least 0.7 mol % of at least one alpha-olefin comonomer. The amount of comonomer is preferably at most 7.0 mol %, more preferably at most 6.0 mol %, and still more preferably at most 5.0 mol %.

As an alpha-olefin comonomer, preferably an alpha-olefin having from 4 to 8 carbon atoms is used. Still more preferably an alpha-olefin selected from 1-butene, 1-hexene, 4-methyl-1-pentene and 1-octene is used.

The polyolefin base resin preferably has an $MFR_5$ (190° C., 5 kg) of from 0.1 to 1.2 g/10 min, more preferably from 0.2 to 0.8 g/10 min, and most preferably from 0.25 to 0.6 g/10 min.

The density of the base resin preferably is from 930 to 960 kg/m$^3$, more preferably is from 935 to 958 kg/m$^3$, and most preferably is from 938 to 952 kg/m$^3$.

In addition to the base resin and the antioxidant, usual additives for utilization with polyolefins, such as pigments (for example carbon black), stabilizers, antacids and/or anti-UVs, antistatic agents and utilization agents (such as processing aid agents) may be present in the polyolefin composition. The amount of such additives usually is 10 wt. % or below.

The polymerisation catalysts for the production of the base resin include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The composition preferably is produced in a process comprising a compounding step, wherein the base resin which is typically obtained as a base resin powder from the reactor, together with the antioxidant and optionally other additives is extruded in an extruder to yield the composition of the invention.

The improved resistance of the polyolefin composition against degradation caused by contact with $ClO_2$-containing water is measured at 90° C. and at a concentration of $ClO_2$ of 4 ppm wherein the equipment used is according to ASTM F2263-03. A pipe made of the polyolefin composition of the invention is capable of obtaining a lifetime of at least 200 h, more preferably of at least 220 h, in this test.

Accordingly, the present invention is also directed to a pipe comprising a polyolefin composition according to the invention including any of the preferred embodiments described above. The pipe is preferably for transportation of drinking water, especially drinking water containing $ClO_2$.

The present invention is also directed to the use of a polyolefin composition according to the invention for the production of a pipe. Still further, the present invention is directed to the use of such a pipe for drinking water transportation.

Still further, the present invention is also directed to the use of an antioxidant for increasing the resistance of a polyolefin composition against degradation caused by contact with $ClO_2$-containing water. The antioxidant is defined as described above including the preferred embodiments.

EXAMPLES

1. Definitions and Measurement Methods a) Density

Density is measured according to ISO 1183. Sample preparation is done in accordance with ISO 1872/2B.

b) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and may be determined at different loadings such as 2.16 kg ($MFR_2$), 5.00 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.

c) Measurement of Lifetime of Pipes in Contact with $ClO_2$

No standard exists yet for evaluating the resistance of pipes comprising a polyethylene composition to $ClO_2$-containing water. However, there is a standard for measuring the resistance to chlorinated water: ASTM F2263-03, "Standard test method for evaluating the oxidative resistance of Polyethylene (PE) pipe to chlorinated water". The lifetime of the pipes is tested accordingly with an equipment according to ASTM F2263-03. However, $ClO_2$ is applied instead of chlorine ($Cl_2$, NaOCl).

A circulation loop is used for water which contains $ClO_2$. The concentration of $ClO_2$ in the water is 4.0±0.1 ppm. The pH of the water is 6.8±0.2. The temperature of the water is 90±1° C. The hoop stress applied to the pipe is about 1.7 MPa. The oxidation reduction potential (ORP) is 740 mV and is measured frequently. The flow volume is 23 l/h at a flow velocity of about 0.13 m/s and a fluid pressure of 6.5 bar. The free pipe length is 250 mm, the outer diameter of the pipe is 12 mm and the thickness of the wall is 2 mm. In the tests two pipes of each material are tested in series, the results given are the average of the two values measured.

The circulation loop used for $ClO_2$ testing is made from inert materials (e.g. titanium, PVDF (Polyvinylidene difluoride), PTFE (Polytetrafluoro-ethylene) to avoid contamination of the test fluid. The fittings are of PVDF. The test fluid is continuously purified in three steps to avoid any contamination: 1. active carbon filter, 2. particle filter, 3. reverse osmosis.

The internal environment is the above-mentioned solution of $ClO_2$ in water, the external environment is air.

The $ClO_2$ is generated directly at the site using a commercial $ClO_2$-generator from Prominent following the equation:

$$5NaClO_2 + 4HCl \rightarrow 4ClO_2 + 2H_2O + 5NaCl$$

The mechanism for feeding the stock solutions ($NaClO_2$ and HCl) to the process are monitored to maintain a consistent ratio of chemicals.

All tests were carried out at Bodycote Polymer AB, Nyköping, Sweden.

d) Measurement of Lifetime of Pipes in Contact with Chlorinated Water

The lifetime measurements for pipes in contact with chlorinated water were performed in accordance with ASTM F2263-03. All tests were carried out at Bodycote Polymer AB, Nyköping, Sweden.

e) Content of Antioxidant

Sample preparation: The polymer pellets are ground and 5 g of the ground polymer is extracted in 50 ml of cyclohexane at a temperature of 81° C. for 2 hours. If needed, cyclohexane is then added to exact 50 ml again. The solution is cooled down in room temperature and thereafter the polymer is precipitated with 50 ml iso-propanol. A suitable amount of the solution is filtered and injected into an HPLC equipment.

The HPLC measurement can e.g. be performed with a reversed phase C-18 column and methanol and water as mobile phase, for example in a ratio of 85:15. A UV detector can be used, wavelength 280 nm for Irganox 1010, Irgafos 168 and Irganox 1330 and 220 nm for Lowinox TBM-6P. The quantification is made using calibration curves in a conventional manner.

2. Lifetime of Pipes Comprising Different Antioxidants

Polyethylene compositions for the testing of pipes were produced from commercially available polyethylene resins. The properties of the base resins used, as well as the additives which were added to the base resins to yield the polyethylene compositions used for pipe production are given in Table 1. In Table 1 also the results of the lifetime tests in $ClO_2$-containing and chlorinated water are given.

In the Example according to the invention (Example 1) as antioxidant 4,4'-Thiobis(2-t-butyl-5-methylphenol) (CAS No. 96-69-5, Lowinox TBM-6P) was used. In Comparative Example 2, a typical mixture of conventional antioxidants as used to provide pipes with good resistance to chlorinated water in usual amounts has been used.

It can be seen from the results in Table 1 that pipes produced from a polyethylene composition comprising conventional antioxidants achieve good results for chlorinated water, however rather bad results for $ClO_2$-containing water (Example 2 (Comp.)). In contrast, the pipe produced from the polyethylene composition comprising antioxidant Lowinox TBM-6P shows a drastically improved performance for $ClO_2$-containing water (Example 1).

Furthermore, it can be seen that the total amount of antioxidant is much less in Example 1 than in Comparative Example 2, and that in Example 1 only one antioxidant is used whereas in Comparative Example 2 a mixture of two different antioxidants was used.

TABLE 1

| Example | | 1 | 2 (Comp.) |
|---|---|---|---|
| Properties of Base Resin | | | |
| $MFR_5$ | g/10 min | 0.9 | 0.85 |
| $MFR_{21}$ | g/10 min | 19.8 | 19 |
| $FRR_{21/5}$ | | 22 | 22.4 |
| Comonomer | | hexene-1 | hexene-1 |
| | wt. % | 3.8 | 4.2 |
| Antioxidants Added | | | |
| Lowinox TBM-6P | ppm | 590 | — |
| Irganox 1010 | ppm | — | 730 |
| Irgafos 168 | ppm | — | 770 |
| Total Amount of Antioxidants | ppm | 590 | 1500 |
| Other Compounds Added | | | |
| Carbon black | wt % | 2.3 | 2.3 |
| Properties of Polyethylene Composition | | | |
| Density | kg/m³ | 950 | 951 |
| Properties of Pipes | | | |
| Resistance against ClO2-containing water | hours | 231 | 152 |
| Resistance against chlorinated water | hours | 847 | 2370 |

The invention claimed is:

1. A method for increasing the resistance of a polyolefin composition comprising a polyolefin base resin against degradation caused by contact with $ClO_2$-containing water, by adding to said polyolefin composition 100 ppm to 1000 ppm of one or more antioxidant selected from the group consisting of:

a) phenols according to formula I:

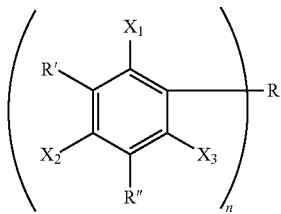

wherein
- R is a non-substituted or substituted aliphatic or aromatic hydrocarbyl radical which may comprise heteroatoms or R is a heteroatom,
- R' and R" independently are a non-substituted or substituted hydrocarbyl radical which may comprise heteroatoms or H,
- $X_1$, $X_2$ and $X_3$ independently are a non-substituted or substituted hydrocarbyl radical which may comprise heteroatoms or H or OH, with at least $X_1$, $X_2$ or $X_3$ being OH,
- n is 1 to 4, and
- at least one of the substituents R, R' and/or R" of the phenol comprises at least one sulphur, phosphorus and/or nitrogen heteroatom(s), b) amine compounds according to formula II:

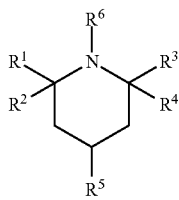

wherein $R^1$, $R^2$, $R^3$, $R^4$ and $R^5$ independently are hydrogen or an aliphatic or aromatic hydrocarbyl radical, optionally comprising heteroatoms, and $R^6$ is hydrogen, and c) sulphur-containing compounds according to formula III:

wherein $R^a$ and $R^b$ independently are an aliphatic or aromatic hydrocarbyl radical, optionally comprising heteroatoms, and contacting said polyolefin composition with $ClO_2$-containing water, wherein said polyolefin composition has a lifetime of at least 200 h in a test measuring the resistance against $ClO_2$-containing water at 90° C. and at a concentration of $ClO_2$ of 4 ppm wherein the equipment used is according to ASTM F2263-03.

2. The method according claim 1, wherein the polyolefin composition comprises an ethylene homo- or copolymer base resin.

3. The method according to claim 1, wherein the increased resistance is imparted to a pipe comprised of the polyolefin composition.

4. The method according to claim 1, wherein the heteroatom of at least one of substituents R, R' and R" is a sulphur atom.

5. The method according to claim 1, further comprising forming a pipe from said polyolefin composition and transporting drinking water through the pipe.

6. The method according to claim 5, wherein the drinking water contains $ClO_2$.

7. The method according to claim 1, wherein the base resin has a density from 930 to 960 kg/m³.

* * * * *